United States Patent Office 3,629,332
Patented Dec. 21, 1971

3,629,332
N-(ARALKYL)FLUOROALKANESULFONAMIDES
Joseph Kenneth Harrington, Edina, and Robert D. Trepka, Woodbury, Minn., assignors to Minnesota Mining and Manufacturing Company, St. Paul, Minn.
No Drawing. Filed Jan. 29, 1969, Ser. No. 795,050
Int. Cl. C07c 143/74
U.S. Cl. 260—556 F                13 Claims

ABSTRACT OF THE DISCLOSURE

N-(aralkyl)fluoroalkanesulfonamides wherein the alkyl group is substituted by one or more optionally substituted phenyl, naphthyl, or heterocyclic radicals and salts thereof and processes for their preparation are disclosed. These compounds and their compositions are plant growth modifiers, i.e. they modify and/or terminate the growth of plants.

FIELD OF THE INVENTION

The present invention relates to substituted fluoroalkanesulfonamides and more particularly to N-(aralkyl)fluoroalkanesulfonamides in which the alkyl group bonded to the amide nitrogen is substituted by one or more (usually not more than two) phenyl, naphthyl or heterocyclic radicals. These can in turn be substituted by a substituent or substituents chosen from the group consisting of halogen, haloalkyl, alkyl, alkoxy, nitro, acylamino, N',N'-dialkylureido, alkylthio, alkylsulfinyl, alkylsulfonyl, nitrile, alkanoyl, haloalkylthio, haloalkanoyl and hydroxy. Salts of the fluoroalkanesulfonamides are also included.

The preparation and use of these compounds and their compositions as plant growth modifiers, i.e. as herbicides and plant growth regulators (other than herbicides) are also included. The compounds are particularly valuable as herbicides.

DESCRIPTION OF THE PRIOR ART

Primary alkyl amines having distal perfluoroalkyl groups are described in British Pat. No. 1,106,642. However, the presence of a primary alkylamino group is a critical feature of the compounds of the British patent. The compounds of this invention do not possess primary alkylamino groups as described by the British patent. The plant growth modifying use of the compounds of the present invention has not been anticipated or suggested by the prior art.

DETAILED DESCRIPTION OF THE INVENTION

The present invention provides compounds of the formula:

$$R_fSO_2NH—R—Ar—Y_n \qquad (I)$$

wherein $R_f$ is a lower fluoroalkyl group, R is a straight or branched chain alkylene radical containing up to five carbon atoms which may additionally be substituted by Ar, Ar is a phenyl, naphthyl or heterocyclic radical, Y is selected from halogen, haloalkyl, alkyl, alkoxy, nitro, acylamino, N',N'-dialkylureido, alkylthio, alkylsulfinyl, alkylsulfonyl, nitrile, alkanoyl, haloalkylthio, haloalkanoyl and hydroxy and $n$ is zero to five. Salts of these compounds are also included within the scope of the invention. The compounds in which a hydrogen atom is bonded to the amide nitrogen (such as in Formula I) can be considered to be the acid form.

For the purposes of this invention, a lower fluoroalkyl radical is a straight or branched chain fluoroalkyl group of not more than about four carbon atoms. Preferably, $R_f$ contains at least two fluorine atoms per carbon atom, and most preferably it is trifluoromethyl. When the ratio of fluorine atoms to carbon atoms in the $R_f$ group is less than 2:1 in the compound of the invention, their herbicidal activity is generally of a lower level.

It is preferred that R be a methylene (—$CH_2$—) group, because such compounds generally have a higher degree of herbicidal effectiveness and are prepared from more readily available starting materials than are the compounds of the invention in which R contains more than one carbon atom.

When Ar is an aromatic heterocyclic radical it may contain oxygen, nitrogen or sulfur as the heteroatoms, and one or more heteroatoms which are the same or different can be included. Presently, preferred heterocyclic radicals are thienyl, furanyl, pyridyl and benzimidazolyl.

In the compounds of the invention in which $n$ is greater than one, the various radicals may be the same or different. When Y is an alkyl, alkanoyl, haloalkylthio, haloalkanoly, alkylthio, alkylsulfinyl, alkylsulfonyl, N,N'-dialkylureido, alkoxy or acylamino group it is preferred that the alkyl portion of the group be straight or branched chain lower alkyl, i.e. containing up to four carbon atoms. Normally, the compounds of the invention do not contain more than one Y group other than halogen, haloalkyl, alkyl, alkoxy, nitro and hydroxy.

Salts of the compounds of Formula I can be prepared by reacting the hydrogen bonded to the sulfonamido nitrogen with an appropriate base under mild conditions. The salts which can be formed include those of alkyl metals, for example, lithium, sodium and potassium, alkaline earth metals such as magnesium, barium and calcium and other metals such as aluminium. The ammonium salts can be prepared similarly by treating the compounds of Formula I with ammonium hydroxide. The salts of organic amines such as alkylamines, morpholine, methyl cyclohexylamine or glucosamine can be obtained by reacting the acid with the appropriate organic base. Salts of heavy metals such as zinc and iron are also within the purview of the invention. The foregoing are horticulturally acceptable salts which are selected for the particular end use.

Representative compounds of the invention include
N-(2-naphthylmethyl)trifluoromethanesulfonamide,
N-[2-benzimidazolylmethyl]trifluoromethanesulfonamide,
N-(3,4-dichlorobenzyl)perfluoro-n-butanesulfonamide,
N-(2,4-dichlorobenzyl)perfluoroisopanesulfonamide,
N-(4-methylthiobenzyl)trifluoromethanesulfonamide,
N-(4-methylsulfinylbenzyl)trifluoromethanesulfonamide,
N-(4-methylsulfonylbenzyl)trifluoromethanesulfonamide,
N-(4-acetamidobenzyl)trifluoromethanesulfonamide, N-[4-(N',N'-dimethylureido)benzyl]trifluoromethane-
  sulfonamide,
N-(2,6-dichlorobenzyl)trifluoromethanesulfonamide,
N-(2,4-dichlorobenzyl)trifluoromethanesulfonamide,
N-(2-chlorobenzyl)trifluoromethanesulfonamide,
N-phenethylfluoromethanesulfonamide,
N-phenethyldifluoromethanesulfonamide,
N-($\alpha$-methylphenethyl)trifluoromethanesulfonamide,
N-($\alpha$-methylphenethyl)difluoromethanesulfonamide,
N-($\alpha$-methylphenethyl)fluoromethanesulfonamide,
di-n-propylammonium N-benzyltrifluoromethanesul-
  fonamide,
N-(4-chlorobenzyl)trifluoromethanesulfonamide,
N-(4-methylbenzyl)trifluoromethanesulfonamide,
N-phenethyltrifluoromethanesulfonamide,
N-(4-methoxybenzyl)trifluoromethanesulfonamide,
N-(3,4-dichlorobenzyl)trifluoromethanesulfonamide,
N-(3-phenyl-n-propyl)trifluoromethanesulfonamide,
N-(2,4-dichlorobenzyl)difluoromethanesulfonamide,
N-(3,4-dichlorobenzyl)difluoromethanesulfonamide,
N-(2,4-dichlorobenzyl)fluoromethanesulfonamide,
N-(3,4-dichlorobenzyl)fluoromethanesulfonamide,
N-(1-phenethyl)trifluoromethanesulfonamide,
N-(3-acetylbenzyl)trifluoromethanesulfonamide,
N-[4-trifluoromethylthiobenzyl]trifluoromethanesul-
  fonamide,
N-(3-trifluoroacetylbenzyl)trifluoromethanesulfonamide,
N-(4-cyanobenzyl)trifluoromethanesulfonamide,
N-(3-trifluoromethylbenzyl)trifluoromethanesulfon-
  amide,
N-[2-($\alpha$-pyridyl)ethyl]trifluoromethanesulfonamide,
N-(3-methylbenzyl)trifluoromethanesulfonamide,
N-(3,5-dichloro-2-hydroxybenzyl)trifluoromethanesul-
  fonamide,
N-(3-fluorobenzyl)trifluoromethanesulfonamide,
N-[2-($\alpha$-pyridyl)ethyl]fluoromethanesulfonamide,
N-(2,3,4,5,6-pentachlorobenzyl)trifluoromethanesul-
  fonamide,
N-(2-nitrobenzyl)trifluoromethanesulfonamide,
N-(2,4-dimethylbenzyl)trifluoromethanesulfonamide,
N-(4-fluorobenzyl)trifluoromethanesulfonamide,
N-(4-nitrobenzyl)trifluoromethanesulfonamide,
sodium N-(3,4-dichlorobenzyl)trifluoromethanesul-
  fonamide,
N-benzyltrifluoromethanesulfonamide,
N-(1-naphthylmethyl)trifluoromethanesulfonamide,
N-(2-thenyl)trifluoromethanesulfonamide,
N-(2-furfuryl)trifluoromethanesulfonamide and
N-benzhydryltrifluoromethanesulfonamide.

The compounds of the invention are generally prepared from intermediate aralkyl halides or primary amines and fluoroalkanesulfonyl halides, fluoroalkanesulfonic anhydrides or fluoroalkanesulfonamides known in the chemical literature according to Methods A and/or B as explained hereinafter. However, certain of the compounds of the invention must be prepared by synthetic routes which require several steps. Usually more than one alternative route is available, but a route for each of these compounds is described below (the trifluoromethyl compounds being utilized as representative).

N - (4 - methylsulfinylbenzyl)trifluoromethanesulfonamide and N-(4-methylsulfonylbenzyl)trifluoromethanesulfonamide are prepared by stepwise oxidation of N-(4-methylthiobenzyl)trifluoromethanesulfonamide with sodium metaperiodate.

Photolytic bromination of p-toluidine gives 4-aminobenzyl bromide. Reaction of 4-aminobenzyl bromide with acetic anhydride gives 4-acetamidobenzyl bromide, the intermediate which is converted to N-(4-acetamidobenzyl)trifluoromethanesulfonamide. The reaction of phosgene with 4-aminobenzyl bromide gives 4-($\alpha$-bromomethylphenyl isocyanate which is reacted with dimethylamine to give 4-($\alpha$-bromomethyl)phenyl-N,N-dimethylurea, which gives the desired sulfonamide using Method B described hereinbelow.

Photolytic bromination of 4-(trifluoromethylthio)toluene and 3-trifluoroacetyltoluene provides 4-(trifluoromethylthio)-benzyl bromide and 3-trifluoroacetylbenzyl bromide, respectively, which provide the desired sulfonamides using Method B described hereinbelow. Treatment of 4-(trifluoromethylthio)benzene with zinc chloride and bis(chloromethyl)ether yields the intermediate 4-(trifluoromethylthio)benzyl chloride.

Analogous compounds having lower fluoroalkyl groups other than the trifluoromethyl group can be prepared utilizing the same reactions.

The two methods by which the acid forms of the compounds of the invention are generally prepared are as follows:

Method A

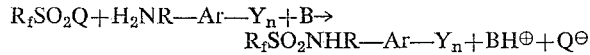

where Q is a halogen or a fluoroalkanesulfonate residue, B is an organic or inorganic base and $R_f$, R, Ar, Y and $n$ are as previously defined.

A solution of the appropriate primary amine and an equimolar quantity (at least) of a suitable acid acceptor (such as triethylamine) in an inert organic solvent is prepared. In some cases B may be $H_2NR\text{---}Ar\text{---}Y_n$. Among the suitable solvents are glyme, benzene and chloroform. An equimolar quantity of the appropriate fluoroalkanesulfonic anhydride or halide is added to the solution. The addition is advantageously carried out at $-15°$ to $50°$ C., but this may be raised or lowered if desired. Usually the reaction is complete within a few minutes following addition. In cases where the amine is of lower reactivity, it is advantageous to allow the reaction mixture to remain at reflux temperature for a few hours following addition.

After completion of the reaction, the product is isolated by conventional methods. For example, the reaction mixture can be extracted with excess aqueous sodium hydroxide. The aqueous extract is then washed with organic solvents and treated with charcoal to remove impurities. Subsequent acidification of the aqueous extract with mineral acid then affords the product as an oil or solid which is distilled, sublimed, chromatographed or recrystallized as required to give pure product. When water-soluble solvents are used, the reaction mixture can be poured directly into aqueous mineral acids. The product is then isolated by conventional extraction techniques and purified as above.

Suitable fluoroalkanesulfonyl anhydrides and halides (e.g. fluorides and chlorides) for use in this method are known to the art (see U.S. Pat. No. 2,732,398) or may readily be prepared by methods known to the art. Similarly, the amines used in producing the compounds of this invention are described in the general chemical literature or are otherwise known to those skilled in the art, or may readily be prepared by methods known to the art.

Method B

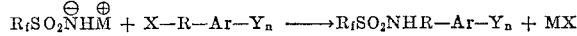

Here X represents a bromine, chlorine or iodine atom and $M^\oplus$ represents a metal ion, for example, sodium or potassium, and $R_f$, R, Ar, Y and $n$ are as previously defined.

This reaction of an appropriate aralkyl halide with the metal salt of a fluoroalkanesulfonamide is carried out in a nonreactive solvent. Among the suitable solvents are dimethyl sulfoxide, dimethylformamide, dimethylacetamide, 1,2-dimethoxyethane and the like.

An equimolar quantity of a solution of the aralkyl halide is added to the amide salt in the same solvent and the reaction proceeds exothermically, although mild preheating may be useful to initiate the reaction. The reaction is stirred, with or without external heating, and the precipitate MX is observed to form in some solvents.

The degree of completion of the reaction is determined by analyzing a small portion of the reaction mixture by various techniques such as thin layer chromatography and/or gas-liquid partition chromatography.

After completion of the reaction, any precipitate is removed by filtration and the mixture poured into water. Solid products are isolated by filtration. Water-soluble or oily products are generally isolated by extraction.

The metal amide salts used as precursors in Method B are prepared from the amides by any of several conventional methods such as reaction with alkali metal hydroxides (e.g. sodium and potassium hydroxides), metal salts of weak acids (such as metal carbonates, acetates and the like), metal hydrides (such as sodium hydride), alkoxides (such as sodium ethoxide and potassium t-butoxide) in protic or aprotic solvents, or by reaction with an alkali metal (such as sodium or potassium) directly in an appropriate solvent. The amides themselves are well known to the art, or may be prepared by methods well known to the art. Similarly, the aralkyl halides previously mentioned for use in this method are well known through the general chemical literature.

The compounds of this invention may be herbicides, that is, agents useful for killing (terminating the growth of) higher plants, and/or they may regulate the growth of plants in other ways. The general term plant growth modification is used herein to encompass herbicidal and other plant growth regulating effects which are included within the activity of the compounds of this invention. Such regulating effects include all deviations from natural development, for example, defoliation, stimulation, stunting retardation, desiccation, tillering, dwarfing, and the like.

In order to control unwanted plants, the compounds of the invention can be used alone, for example, as dusts or granules of the compounds, or preferably they may be applied in formulations. The formulations are comprised of active ingredients and one or more plant growth modifying adjuvants and/or carriers. Generally, an inert horticultural diluent is used together with the active ingredient and frequently also a surface active agent is included. Formulations are useful to facilitate the application of the compounds and to achieve specific biological objectives such as controlling the availability of the plant growth modifier, improving adherence to plants, and the like, as is well known to those skilled in the art.

The compounds of the invention may be formulated as wettable powders, emulsifiable concentrates, aqueous or nonaqueous solutions and/or suspensions, granules, dusts and the like. Said compounds can be finely divided and suspended in any of the usual aqueous media, or if appropriate salts are used, a solution may be chosen. Spreading agents, wetting agents, sticking agents or other adjuvants can be added as desired.

When emulsifiable concentrates are prepared the active ingredient can be in a concentration of about 5% to 60% or more, depending upon its solubility. The units of concentration are weight per unit weight. When the active ingredients are not the salts of the invention they are soluble in common organic horticultural solvents such as benzene, toluene, xylene, dichloromethane, chloroform, hexane and heptane or less highly refined aromatic or aliphatic hydrocarbons and mixtures thereof. Examples of these are coal tar fractions, straight run petroleum distillates, thermolytically or catalytically cracked hydrocarbon oil, gas oil, light lubricating oil fractions, kerosene, mineral seal oil, and the like. In appropriate cases oxygenated solvents such as ketones may be used in or as the carriers. These concentrates can be dispersed in water to permit the use of an aqueous spray. Admixture with a small amount of an organic surface active agent capable of lowering the surface tension of water is preferred.

Examples of surface active agents variously known as dispersing agents, wetting agents, or emulsifying agents comprise soft or hard soaps, morpholine or dimethylamine oleate, sulfonated fish, castor and petroleum oils, sodium salts of lignin sulfonic acid, alkylated aromatic sodium sulfonates, such as decylbenzene sodium sulfonate, dodecylbenzene sodium sulfonate, butyl or other amine salts of decyl or dodecylbenzene sulfonic acid, sodium lauryl sulfate, disodium monolauryl phosphate, ethylene oxide condensation products of alkyl phenols, as, for example, octyl phenol, ethylene oxide condensation products of tall oil, and ethylene oxide condensation products of higher alcohols or higher mercaptans. Mixtures of two or more surface active agents are also feasible. Generally, the surface active agent will comprise only a small proportion of the composition, say 0.1–15% by weight of the toxicant.

The formulation of dry compositions for application as granules, dusts or for further dilution with liquid carriers is readily accomplished by mixing the toxicant with a solid carrier. Such solid carriers will be of various sizes from dust to granules. The techniques for such formulations are well known to the art. Suitable carriers include charcoal, talc, clay, pyrophyllite, silicas, fuller's earth, lime, diatomaceous earth, flours such as walnut shell, wheat, soya bean, cottonseed and wood flours, magnesium and calcium carbonate, calcium phosphate and the like. Powders may be granulated by the use of suitable binders such as cellulose derivatives, for example, ethyl or carboxymethyl, corn syrup, and the like. The compounds or the above formulations are applied by spraying, spreading, dusting or the like. The rate of application will of course vary, but the more active compounds of the invention exhibit satisfactory control of broadleaf and grass weeds at the application rate of about 5 to 40 lbs. per acre. It is of course to be expected that local conditions, for example, temperature, humidity, moisture content of the soil, nature of the soil, and the like, may require greater or smaller amounts. Effective resolution of these factors is within the skill of those versed in the herbicidal art. Likewise it is apparent that not all of the compounds included within the scope of the invention have equal activity.

The herbicidal compositions may contain one or more of the herbicidal compounds set out hereinbefore as the sole active species, or they may contain in addition thereto other biologically active substances. Thus insecticides and fungicides may be incorporated in the compositions. Further, if desired, the herbicidal compositions may contain fertilizers, trace metals or the like and when applied directly to the soil may additionally contain nematicides, soil conditioners, and other plant growth regulators and/or herbicides of similar or different properties.

Presently preferred herbicidal compounds of this invention are

N-(2,4-dichlorobenzyl)trifluoromethanesulfonamide
N-(3,4-dichlorobenzyl)trifluoromethanesulfonamide
N-(4-chlorobenzyl)trifluoromethanesulfonamide
N-benzyltrifluoromethanesulfonamide
N-(2-thenyl)trifluoromethanesulfonamide
N-(2,3,4,5,6-pentachlorobenzyl)trifluoromethanesulfonamide
N-(2-chlorobenzyl)trifluoromethanesulfonamide
N-(2,6-dichlorobenzyl)trifluoromethanesulfonamide Some of the compounds of the present invention have biological activity in addition to plant growth modifying activity such as insecticidal, acaricidal, nematicidal, analgesic and anti-inflammatory activity. The compounds of the invention are organic acids, and as such have useful activity as polymerization catalysts, for example, for epoxide monomers.

In order to further illustrate the invention, the following non-limiting examples are provided. Melting points are uncorrected.

EXAMPLE 1

N-(2-chlorobenzyl)trifluoromethansulfonamide

The compound 2-chlorobenzylamine (28.3 g., 0.20 mole), triethylamine (21.2 g., 0.21 mole), and chloroform (200 ml.) were charged into a 500 ml. round bottom flask fitted with a condenser, stirring motor, addition funnel, and nitrogen flush. Over a period of one hour, trifluoromethanesulfonic acid anhydride (56.4 g., 0.20 mole) was added dropwise with only a slight exotherm (30° C.). Stirring was continued at room temperature for 30 minutes and the solution was then heated to reflux for an additional hour. The cooled dark solution was poured into ice water (750 ml.), the mixture shaken, and the layers separated. The water layer was extracted twice with chloroform (50 ml.). The chloroform layers were combined, dried by means of sodium sulfate, and evaporated to a dark oil. This oil was stirred with 5% sodium hydroxide solution (1.2 l.) for three days. The resulting dark solution was extracted three times with chloroform (50 ml.), filtered, acidified to pH 1 with concentrated hydrochloric acid and cooled. The white solid that formed was collected by filtration, washed with water, and dried. One half of this material was sublimed and then recrystallized from ligroin to afford analytically pure N-(2-chlorobenzyl)trifluoromethanesulfonamide, M.P. 36.5–37.5° C.

*Analysis.*—Calc'd for $C_8H_7ClF_3NO_2S$ (percent): C, 35.1; H, 2.6. Found (percent): C, 35.3; H, 2.6.

EXAMPLE 2

N-(2,6-dichlorobenzyl)trifluoromethanesulfonamide

The monosodium salt of trifluoromethane sulfonamide (34.2 g., 0.2 mole) was dissolved in anhydrous dimethylsulfoxide (75 ml.) in a 500 ml. round bottom flask equipped with an addition funnel, stirring motor, and nitrogen flush. This solution was warmed to 50° C. and 2,6-dichlorobenzylbromide (24.0 g., 0.10 mole) dissolved in anhydrous dimethylsulfoxide was added dropwise over a period of 30 minutes. After the addition was begun, the heat of reaction kept the reaction solution at 50° C. and the external heating source was removed. After the addition was complete, the solution was stirred for 3½ hours at 50° C. with a precipitate forming after the first 30 minutes of heating. The reaction mixture was cooled, filtered, and the solution poured into ice water (1 l.). The white solid that formed was dried and recrystallized twice from benzene-hexane to afford analytically pure product, M.P. 91.0–91.5° C.

*Analysis.*—Calc'd for $C_8H_6Cl_2F_3NO_2S$ (percent): C, 31.2; H, 2.0. Found (percent): C, 31.5; H, 2.1.

EXAMPLE 3

N-(3,5-dichloro-2-yhdroxybenzyl)trifluoromethanesulfonamide

Thionyl chloride (240 g., 2 mols) was refluxed with 2,4-dichlorophenoxyacetic acid (336 g., 1.5 mols) until evolution of sulfur dioxide and hydrochloric acid stopped. The excess thionyl chloride was removed in vacuo, then the solution was azeotropically distilled with benzene. The product acyl halide was vacuum distilled at 116° C./0.3 mm.

Trifluoromethanesulfonamide (119 g., 0.80 mole) and sodium carbonate (170 g., 1.6 mols) were stirred in acetone (1.5 l.) solution for four hours, then 2,4-dichlorophenoxyacetyl chloride (192 g., 0.80 mole) in acetone was added slowly and the reaction was stirred overnight. The reaction mixture was filtered and evaporated in vacuo. The residue was washed thoroughly with diethyl ether leaving a white solid. The ether was evaporated to yield a clear orange oil. This oil slowly crystallized. It was recrystallized from toluene, then benzene, then trichloroethylene, distilled, recrystallized again from trichloroethylene and dried to yield the white product, N-(3,5-dichloro-2-hydroxybenzyl)trifluoromethanesulfonamide, M.P. 87.5–89° C. The structural assignment is based on the elemental analysis, infrared spectrm and nuclear magnetic resonance spectrum.

*Analysis.*—Calc'd for $C_8H_6Cl_2F_3NO_3S$ (percent): C, 29.6; H, 1.9; N, 4.2. Found (percent): C, 29.6; H, 1.9; N, 4.3.

The following compounds were prepared according to the general procedures of Methods A and/or B. The intermediate amines used in Method A to prepare the compounds of Examples 1, 4 through 12, 14 through 25 and 28 through 36 are known in the chemical literature, and most are commercially available. The intermediate aralkyl halides used in Method B to prepare the compounds of Examples 2, 26 and 27 are known in the chemical literature.

| | | |
|---|---|---|
| 4 | N-[2-(α-pyridyl)ethyl]trifluoromethanesulfonamide. | 84–88. |
| 5 | N-(3-methylbenzyl)trifluoromethanesulfonamide. | 108–112/0.075 mm. |
| 6 | N-(3-fluorobenzyl)trifluoromethanesulfonamide. | 1110–111/0.15. |
| 7 | N-[2-(α-pyridyl)ethyl]fluoromethanesulfonamide. | 89.5–91.5. |
| 8 | N-phenethylfluoromethanesulfonamide. | 100/0.025 mm. dec. |
| 9 | N-phenethyldifluoromethanesulfonamide. | 100/0.05 mm. dec. |
| 10 | N-(α-methylphenethyl)trifluoromethanesulfonamide. | 76–79. |
| 11 | N-(α-methylphenethyl)difluoromethanesulfonamide. | >60/0.05 mm. |
| 12 | N-(α-methylphenethyl)fluoromethanesulfonamide. | Not distillable. |
| 13 | N-(4-isobutylbenzyl)trifluoromethanesulfonamide.[1] | 51–52. |
| 14 | Di-n-propylammonium N-benzyl.trifluoromethanesulfonamide.[2] | 60–61. |
| 15 | N-(4-chlorobenzyl)trifluoromethanesulfonamide. | 70–71. |
| 16 | N-(4-methylbenzyl)trifluoromethanesulfonamide. | 77–78. |
| 17 | N-phenethytrifluoromethanesulfonamide. | 36.5–37. |
| 18 | N-(4-methoxybenzyl)trifluoromethanesulfonamide. | 66.5–67.5. |
| 19 | N-(3,4-dichlorobenzyl)trifluoromethanesulfonamide. | 163/0.8. mm. |
| 20 | N-(3-phenyl-n-propyl)trifluoromethanesulfonamide. | 134–136/0.7 mm. |
| 21 | N-(2,4-dichlorobenzyl)difluoromethanesulfonamide. | 69.5–71. |
| 22 | N-(3,4-dichlorobenzyl)difluoromethanesulfonamide. | 56.5–58. |
| 23 | N-(2,4-dichlorobenzyl)fluoromethanesulfonamide. | 78–80. |
| 24 | N-(3,4-dichlorobenzyl(fluoromethanesulfonamide. | 66.5–67.5. |
| 25 | N-(1-phenethyl)trifluoromethanesulfonamide. | 76–78/0.05 mm. |
| 26 | N-(2,3,4,5,6-pentachlorobenzyl)trifluoromethanesulfonamide. | 134.135–5. |
| 27 | N-(2-nitrobenzyl)trifluoromethanesulfonamide. | 75.5–77.5. |
| 28 | N-(2,4-dimethylbenzyl)trifluoromethanesulfonamide. | 65–66. |
| 29 | N-(4-fluorobenzyl)trifluoromethanesulfonamide. | 54–55. |
| 30 | N-(4-nitrobenzyl)trifluoromethanesulfonamide. | 48–49.5 |
| 31 | Sodium (N-3,4-dichlorobenzyl)trifluoromethanesulfonamide.[3] | Very hygroscopic. |
| 32 | N-benzyltrifluoromethanesulfonamide. | 42.5–45. |
| 33 | N-(1-naphthylmethyl)trifluoromethanesulfonamide. | 79–80. |
| 34 | N-(2-furfuryl)trifluoromethanesulfonamide. | 50–51. |
| 35 | N-(2-thenyl)trifluoromethanesulfonamide. | 8–10. |
| 36 | N-benzhydryltrifluoromethanesulfonamide. | 99–100.4. |

[1] Isobutylbenzene was treated with bis(chloromethyl) ether and zinc chloride to provide the necessary intermediate, 4-isobutylbenzyl chloride.
[2] Prepared by stirring the compound of Example 32 and di-(n-propyl) amine in diethyl ether overnight.
[3] Prepared by stirring equimolar amounts of the compound of Example 19 with sodium hydroxide in ethanol and recovering the solid product.

In each example (Examples 1–36) elemental analyses of the products were consistent with the assigned structure.

The herbicidal activity of a number of compounds of the invention was established. Both pre- and post-emergence activity were determined in a direct screen against selected weed species. For the pre-emergence test, the following weed mixtures were planted in four rows in 6-inch plastic pots.

GRASSES

Giant Foxtail (*Setaria faberii*)
Barnyard grass (*Echinochloa crusgalli*)
Crabgrass (*Digitaria isohaemum*)
Quackgrass (*Agropyron repens*)

BROADLEAVES

Pigweed (*Amaranthus retroflexus*)
Purslane (*Portulaca oleracea*)
Wild Mustard (*Brassica kaber*)
Wild Morning Glory (*Convolvulus arvensis*)

Two species were planted per row to allow for easier identification of the grass species as they emerge. 250 mg. of the test chemical was dissolved in acetone or another suitable solvent and then diluted with 125 ml. water to give a concentration of 2000 p.p.m. or 62.5 ml. of water to give 4000 p.p.m. From the 2000 p.p.m. concentration, 60 ml. was diluted to 240 ml. to give a final concentration of 500 p.p.m. Eighty ml. of this solution was added to a 6" pot to give a concentration equivalent to 20 lbs./acre or 160 ml. was added to give 40 lb./acre. All subsequent waterings were made from the bottom. Two pots were used per treatment. Data were taken two to three weeks after treatment and recorded as percent kill for each species compared to the untreated controls.

In order to assess post-emergence activity, the same weed mixture as described above was used. The mixture was planted in 5 x 5-inch boxes and allowed to grow from 2 to 3 weeks depending on the time of the year. The plants were treated when the grasses were approximately 1 to 3 inches and the broadleaves 1½ inches tall. Duplicate boxes were sprayed one at a time with a concentrate sprayer (DeVilbis') for approximately 10 seconds or until good wetting of the leaf surfaces occurred. The chemicals were prepared as described above but utilizing only the 2000 p.p.m. concentrations. Data were taken two to three weeks after treatment and recorded as percent kill for each species compared to the untreated controls.

The compounds of Examples 1, 2, 4 through 13 and 15 through 35 were tested. All of the compounds tested show activity at 40 lb./acre or 4000 p.p.m., although not all of the compounds were equally active. The compounds of this invention are generally particularly effective as post-emergence herbicides.

What is claimed is:

1. A compound of the formula $$R_fSO_2NH-R-Ar-Y_n$$

wherein $R_f$ is a lower fluoroalkyl group containing at least two fluorine atoms per carbon atom, R is a straight or branched chain alkylene radical containing up to five carbon atoms or a phenyl-substituted methylene group of the formula —CH($C_6H_5$)—, Ar is selected from phenyl and naphthyl, Y is selected from halogen, haloalkyl, alkyl, alkoxy, nitro, alkamoylamino, N',N-dialkylureido, alkylthio, alkylsulfinyl, alkylsulfonyl, nitrile, alkanoyl, haloalkylthio, haloalkanoyl, and hydroxy, n is zero to five and horticulturally acceptable salts thereof, provided that each Y group contains not more than four carbon atoms and that not more than one Y group is other than halogen, haloalkyl, alkyl, alkoxy, nitro and hydroxy.

2. A compound according to claim 1 wherein $R_f$ is $CF_3$.
3. A compound according to claim 1 wherein Y is halogen.
4. A compound according to claim 1 wherein R is —$CH_2$— and Ar is phenyl.
5. A compound according to claim 1 of the formula

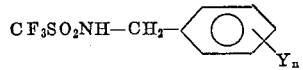

and horticulturally acceptable salts thereof.

6. A compound according to claim 5 wherein Y is chlorine.
7. N - (2,4 - dichlorobenzyl)trifluoromethanesulfonamide according to claim 1.
8. N - (3,4 - dichlorobenzyl)trifluoromethanesulfonamide according to claim 1.
9. N - (4 - chlorobenzyl)trifluoromethanesulfonamide according to claim 1.
10. N-benzyltrifluoromethanesulfonamide according to claim 1.
11. N-(2,3,4,5,6 - pentachlorobenzyl)trifluoromethanesulfonamide according to claim 1.
12. N-(2 - chlorobenzyl)trifluoromethanesulfonamide according to claim 1.
13. N - (2,6 - dichlorobenzyl)trifluoromethanesulfonamide according to claim 1.

References Cited

UNITED STATES PATENTS 1,915,334   6/1933   Salzberg et al. _____ 260—243

OTHER REFERENCES

Chem. Abstracts, vol. 55: 11432d, 1961, El-Hewehi et al.

HENRY R. JILES, Primary Examiner
S. D. WINTERS, Assistant Examiner

U.S. Cl. X.R.

71—103, 90, 92, 94, 88; 260—553 A, 465 E, 329 S, 347.2, 294.8 F, 309.2, 247.1, 543 R, 211